(12) United States Patent
Lin

(10) Patent No.: US 7,525,739 B2
(45) Date of Patent: Apr. 28, 2009

(54) ZOOM LENS MODULE

(75) Inventor: Jui-Hsin Lin, Taipei Hsien (TW)

(73) Assignee: Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 0 days.

(21) Appl. No.: 11/847,284

(22) Filed: Aug. 29, 2007

(65) Prior Publication Data

US 2008/0151387 A1 Jun. 26, 2008

(30) Foreign Application Priority Data

Dec. 22, 2006 (CN) .................. 2006 1 0201363

(51) Int. Cl.
*G02B 15/14* (2006.01)
*G02B 7/02* (2006.01)
(52) U.S. Cl. ...................... 359/696; 359/824
(58) Field of Classification Search .......... 359/694–824
See application file for complete search history.

(56) References Cited

U.S. PATENT DOCUMENTS 5,490,015 A * 2/1996 Umeyama et al. ........... 359/824
6,078,438 A * 6/2000 Shibata et al. .............. 359/819

* cited by examiner

*Primary Examiner*—Mohammed Hasan
(74) *Attorney, Agent, or Firm*—Zhigang Ma

(57) ABSTRACT

A zoom lens module includes a lens barrel, a piezoelectric actuator, and at least two lens modules. The piezoelectric actuator is disposed within the lens barrel. The piezoelectric actuator includes a piezoelectric ceramic component and a sliding member. At least one of the lens modules is attached to the sliding member. The other lens module is fixed in the lens barrel. The piezoelectric ceramic component drives the sliding member to move in a selected direction along an optical axis of the zoom lens module, so that the at least one lens module is moved relative to the other lens module, thus changing the focus of the zoom lens module (e.g., zoom or widen).

19 Claims, 4 Drawing Sheets

ZOOM LENS MODULE

TECHNICAL FIELD

The present invention relates to lens modules and, particularly, to a zoom lens module.

BACKGROUND

As the development of high performance and multiple functions for mobile electronic devices like cellular phones, personal digital assistants (PDAs) and laptop computers continues, the combination of digital image acquisition technology with mobile electronic devices has become an important trend in the development of mobile multimedia technology.

In recent years, miniature lens modules for image acquisition for use in such mobile devices have been gradually upgraded from traditional fixed-focus lenses to zoom lens systems. A typical zoom lens module uses a voice coil motor (VCM) or stepping motor and a mechanical driving system to drive a lens module mounted in a lens barrel to allow zooming/widening (depending on direction driven). However, the mechanical structure of such a zoom lens module tends to be relatively complicated and bulky. The assembly typically requires a large number of components to perform the selectable zoom function by facilitating the driving of the lens module mounted in the lens barrel. As a result, it has proven difficult to reduce the size and volume of the zoom lens module. Meanwhile, as the mobile devices become lighter, thinner and smaller, the typical zoom lens is difficult to incorporate into mobile devices, and the production cost thereof is high.

Therefore, it is desirable to provide a zoom lens module of simple structure and smaller volume.

SUMMARY

In accordance with a present embodiment, a zoom lens module includes a lens barrel, a piezoelectric actuator, and at least two lens modules. The piezoelectric actuator is disposed within the lens barrel. The piezoelectric actuator includes a piezoelectric ceramic component and a sliding member incorporated into the piezoelectric ceramic component. At least one lens module is attached to the sliding member. The piezoelectric ceramic component drives the sliding member to move in a direction along an optical axis so that the at least one lens module is moved along the optical axis relative to at least one other lens module.

Other advantages and novel features will be drawn from the following detailed description of preferred embodiments when conjunction with the attached drawings.

BRIEF DESCRIPTION OF THE DRAWINGS

Many aspects of the present zoom lens module can be better understood with reference to the following drawings. The components in the drawings are not necessarily drawn to scale, the emphasis instead being placed upon clearly illustrating the principles of the present zoom lens module. Moreover, in the drawings, like reference numerals designate corresponding parts throughout the several views.

DETAILED DESCRIPTION OF THE PREFERRED EMBODIMENT

Embodiments of the present zoom lens module will now be described in detail below and with reference to the drawings.

Figure 1:
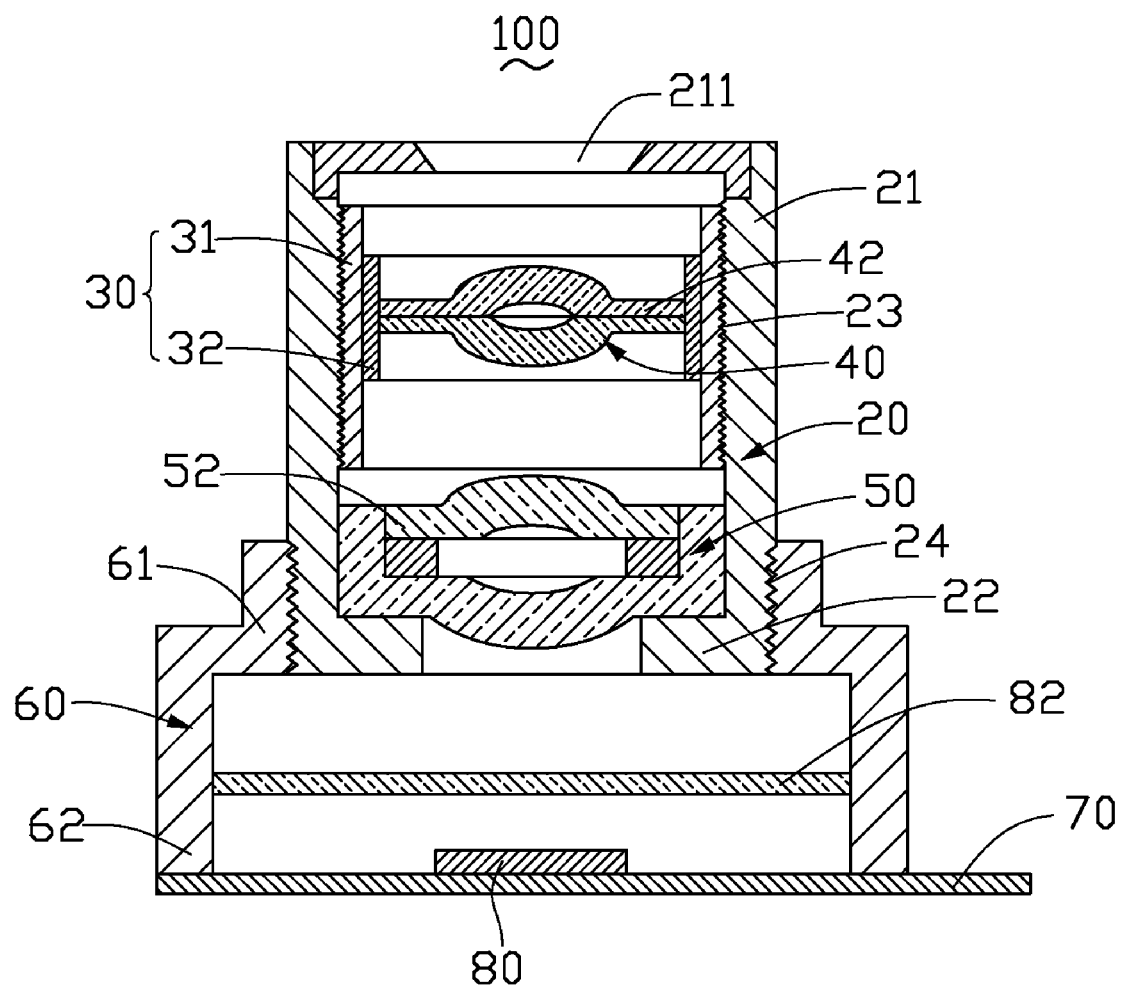
FIG. 1 is a cross section view of a zoom lens module, according to a first present embodiment.

FIG. 1 illustrates a zoom lens module 100, in accordance with a first present embodiment. The zoom lens module 100 includes a lens barrel 20, a piezoelectric actuator 30, a first lens module 40, a second lens module 50, and a holder 60.

The lens barrel 20 is formed in a cylinder shape and is configured (i.e., structured and arranged) for accommodating/carrying the piezoelectric actuator 30, the first lens module 40, and the second lens module 50 therein. The lens barrel 20 has a first end 21 and a second end 22. An aperture 211 is defined at the first end 21, actually close to the distal portion thereof. Light can enter through the aperture 211 into the zoom lens module 100 and pass through the first lens module 40 and the second lens module 50, in turn. A first screw thread 23 is formed in the inner wall of the first end 21 to fix the piezoelectric actuator 30 in place. A second screw 24 thread is formed in the outer wall of the second end 22 to join the lens barrel 20 to the holder 60 by rotation (i.e., screw-action) of the lens barrel 20. Unless otherwise specified, it is to be understood that the first end 21 and the second end 22 refer to the respective general end portions and not particularly just the distal segments of each.

The piezoelectric actuator 30 includes a piezoelectric ceramic component 31 and a sliding member 32. The piezoelectric ceramic component 31 is cylindrical in shape and includes a counterpart screw thread complementary to the first screw thread 23. The counterpart screw thread is thus configured for joining the piezoelectric ceramic component 31 to the lens barrel 20, near the first end 21. The sliding member 32 is formed in a cylindrical shape matching with the piezoelectric ceramic component 31 and is accommodated inside the piezoelectric ceramic component 31. The inner diameter of the piezoelectric ceramic component 31 is equivalent to the outer diameter of the sliding member 32 such that the sliding member 32 is positioned in close contact with the piezoelectric ceramic component 31, thus forming a linear piezoelectric ceramic motor. The central axis of the lens barrel 20, the piezoelectric ceramic component 31, and the sliding member 32 is essentially the same as the optical axis of the zoom lens module 100. The piezoelectric ceramic component 31 has a reverse piezoelectric effect, which transforms electrical energy to mechanical energy. That is to say, when a voltage is applied to the piezoelectric ceramic component 31, the piezoelectric ceramic component 31 transforms the voltage to induce a mechanical structure change (i.e., an expansion or contraction, depending on the polarity of the applied charge). The mechanical expansion/contraction drives the sliding member 32 to slide relative to the piezoelectric ceramic component 31 along the optical axis. It is to be understood that application of an oscillating voltage would effectively induce mechanical vibrations in the piezoelectric ceramic component 31, due to the rapid expansion/contraction changes therein. Such vibrations can yield a friction force between the piezoelectric ceramic component 31 and the sliding member 32. Such a friction force, in turn, can be used to cause controllable movement between such parts. Usefully, the applied voltage is a high frequency voltage that enables the piezoelectric ceramic component 31 to produce mechanical vibrations with a high frequency.

The first lens module 40 includes at least a first lens 42. In the first present embodiment, the first lens module 40 is a compound lens including two first lenses 42 and is configured for enhancing the image definition of the zoom lens module 100. The first lens 42 is beneficially made of an optical glass or plastic. Usefully, an anti-reflection coating is coated on the first lens 42 in order to enhance light transmittance thereof. Accordingly, the image brightness formed by the zoom lens module 100 can be improved. The first lens 42 can be attached to the sliding member 32 using glue or another adhesive.

The second lens module 50 includes at least a second lens 52. In the first present embodiment, the second lens module 50 is a compound lens including two second lenses 52. The second lens module 50 is configured for enhancing the image definition produced by the zoom lens module 100. The second lens 52 is advantageously made of an optical glass or plastic. Further, an anti-reflection coating is, opportunely, coated on the second lens 52 for enhancing light transmittance therethrough. Accordingly, the image brightness formed by the zoom lens module 100 can be increased in this manner. The second lens 52 can be attached to the lens barrel 20 near the second end 22 using an adhesive or glue.

The holder 60 has a first end 61 and a second end 62. A third screw thread is formed in the inner wall of the first end 61 to match the second screw thread 24 formed in the outer wall of the lens barrel 20 in the second end 22. The lens barrel 20 is joined to the holder 60 by rotating the lens barrel 20 relative thereto (i.e., via screw-action). The holder 60 is configured for fixing a printed circuit board 70 in the second end 62. In addition, within the holder 60, a sensor 80, and a light filter 82 are installed between the printed circuit board 70 and the second lens module 50. The sensor 80, for example, a Charge Coupled Device (CCD) or a Complementary Metal Oxide Semiconductor (CMOS), electrically connects to the printed circuit board 70. To enhance the image definition, the light filter 82 is mounted to the holder 60 using glue/adhesive and is located between the second lens module 50 and the sensor 80 for preventing stray/unwanted light from entering through the aperture 211, the first lens module 40, and the second lens module 50. The light filter 82 can be, for example, an IR cut filter.

In operation, a voltage is applied to the piezoelectric ceramic component 31, and the piezoelectric ceramic component 31 transforms the oscillating electrical energy/current into mechanical vibrations. The piezoelectric ceramic component 31 creates supersonic vibrations and propagates the vibrations along the optical axis at the surface of the piezoelectric ceramic component 31. Due to the close contact of the piezoelectric ceramic component 31 and the sliding member 32, the mechanical vibrations created by the piezoelectric ceramic component 31 causes a friction force to be produced between the piezoelectric ceramic component 31 and the sliding member 32. The friction force drives the sliding member 32 to slide relative to the piezoelectric ceramic component 31 along the optical axis in a manner such that the first lens module 40, attached to the sliding member 32 is simultaneously moved along the optical axis. Since the second lens module 50 is fixed in the second end 22 of the lens barrel 20, when the first lens module 40 is moved by the sliding member 32 along the optical axis of the zoom lens module 100, the distance between the first lens module 40 and the second lens module 50 is changed and thus varies the focal length of the zoom lens module 100. Accordingly, the zoom function of the zoom lens module 100 is achieved. The opposite widening function can, of course, be accomplished by reversing the relative movement between the piezoelectric ceramic component 31 and the sliding member 32. The zoom and widening functions can together be considered to define the focus function of the zoom lens module 100.

Figure 2:
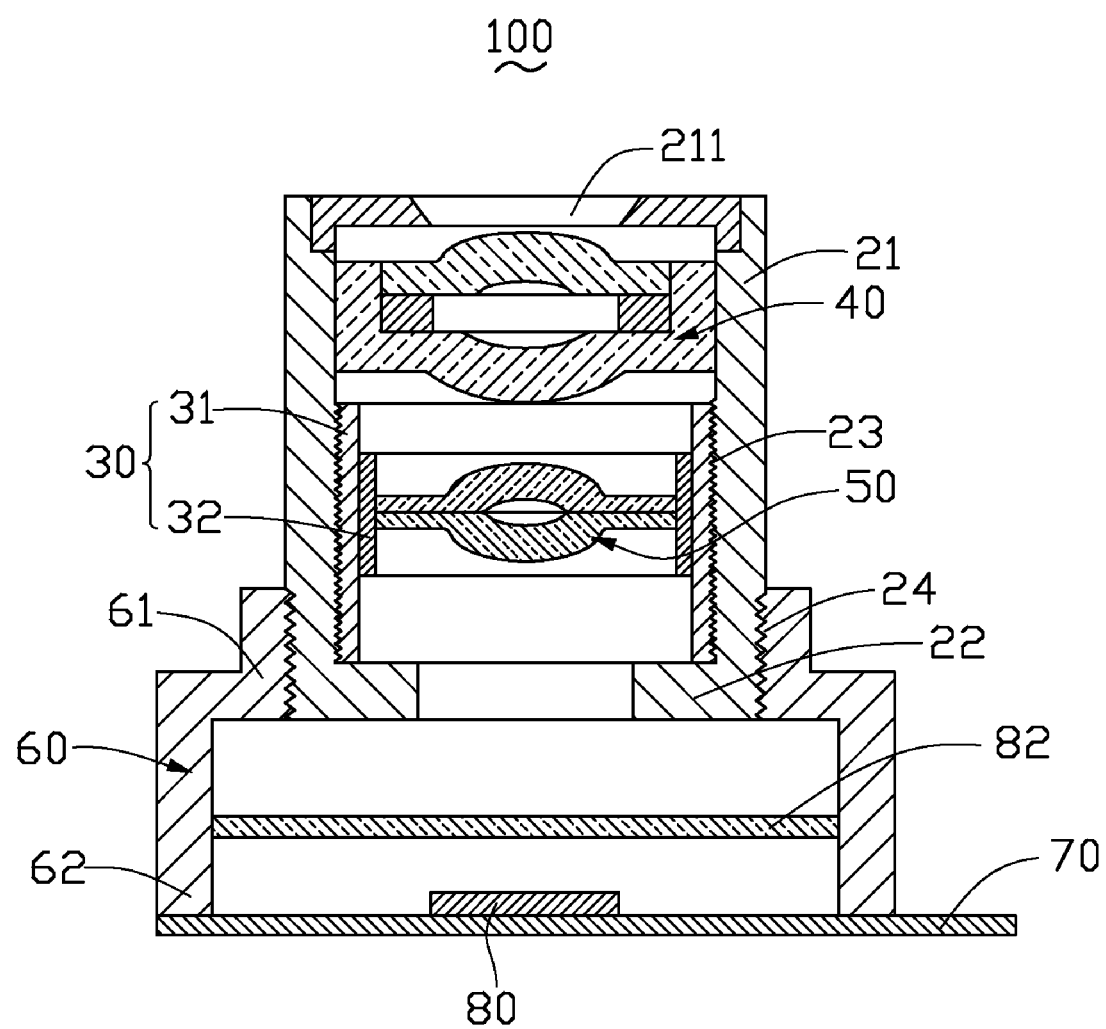
FIG. 2 is a cross section view of the zoom lens module having a third lens module, according to the first present embodiment.

Alternatively, in another present embodiment, the piezoelectric ceramic component 31 can be disposed in the second end 22 and the first lens module 40 is fixed in the first end 21, as shown in FIG. 2. The piezoelectric ceramic component 31 creates mechanical vibrations under an applied voltage and causes a friction force to be produced between the piezoelectric ceramic component 31 and the sliding member 32. The friction force drives the sliding member 32 to slide relative to the piezoelectric ceramic component 31 along the optical axis of the zoom lens module 100 such that the second lens module 50 attached to the sliding member 32 is simultaneously moved along the optical axis. Since the first lens module 40 is fixed in the first end 21 of the lens barrel 20, when the second lens module 50 is moved by the sliding member 32, the distance between the first lens module 40 and the second lens module 50 is changed and thus varies the focal length of the zoom lens module 100. Zooming/widening (i.e., the focusing capability) of the zoom lens module 100 is thus selectably achieved.

Figure 3:
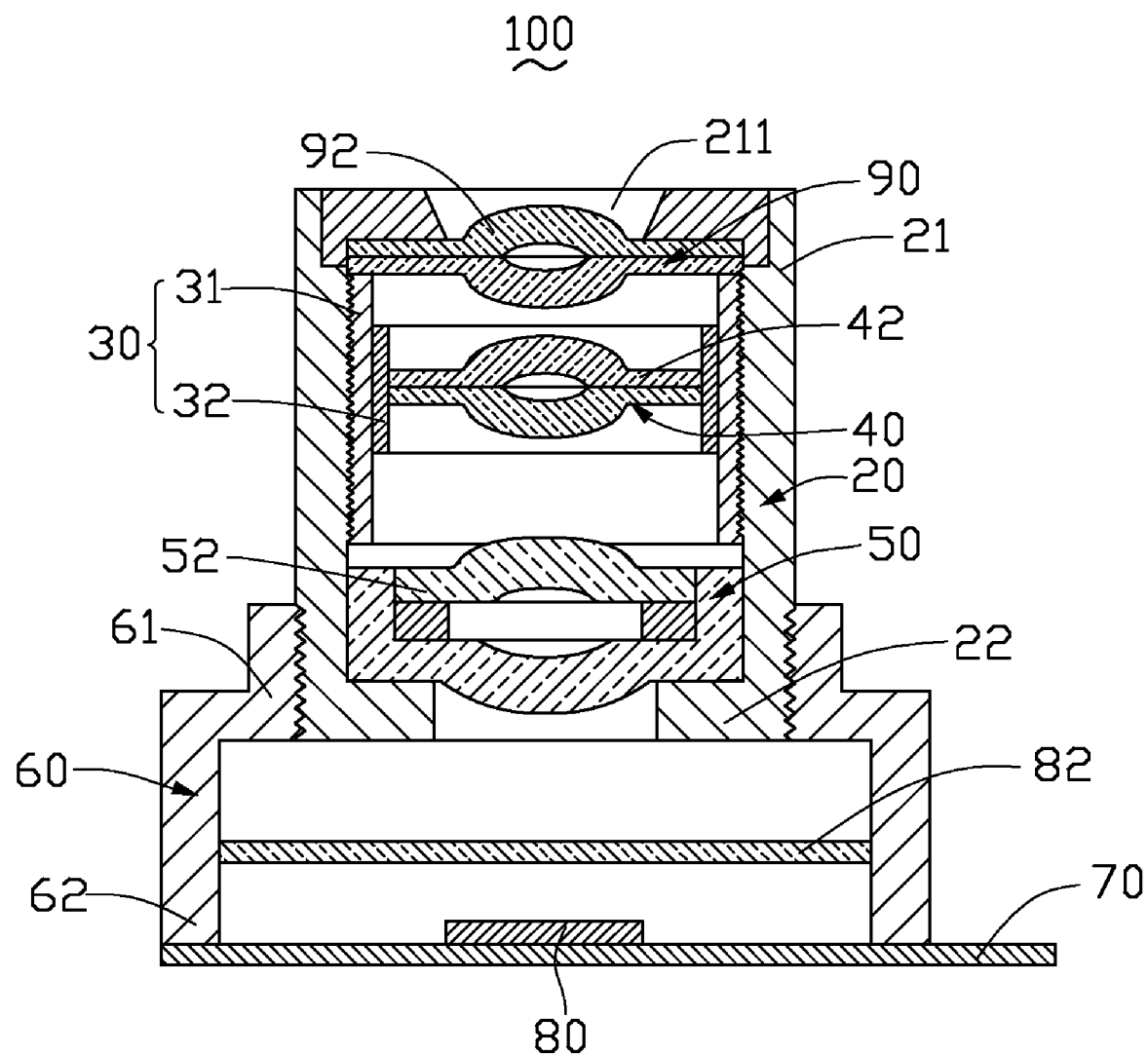
FIG. 3 is a cross section view of a zoom lens module, according to a second present embodiment.

Referring to FIG. 3, the zoom lens module 100 may further include a third lens module 90. The third lens module 90 is mounted in the first end 21 of the lens barrel 20 by gluing and located between the aperture 211 and the first lens module 40. The third lens module 90 includes at least a third lens 92. The third lens module 90 may be a compound lens including two third lenses 92, the third lens module 90 being configured for further enhancing the image definition capability of the zoom lens module 100. The third lens 92 is, beneficially, made of an optical glass or plastic. Advantageously, an anti-reflection coating is applied to the third lens 92, thus aiding the light transmittance ability thereof. Accordingly, the image brightness formed by the zoom lens module 100 can be enhanced.

During the operation of the zoom lens module 100, the piezoelectric ceramic component 31 drives the sliding member 32 to move along the optic axis. The first lens module 40 attached to the sliding member 32 is simultaneously moved with the sliding member 32 along the optical axis of the zoom lens module 100. Since the second lens module 50 is fixed in the second end 22 and the third lens module 90 is fixed in the first end 21 of the lens barrel 20, when the first lens module 40 is moved with the sliding member 32 along the optical axis of the zoom lens module 100, the distance between the first lens module 40 and the second lens module 50, and the distance between the first lens module 40 and the third lens module 90 are respectively changed. Such changes in these distances thus vary the effective focal length of the zoom lens module 100. Accordingly, the focusing function of the zoom lens module 100 is achieved. In this present embodiment, the image definition capability of the zoom lens module 100 is increased by using multiple lens modules.

Figure 4:
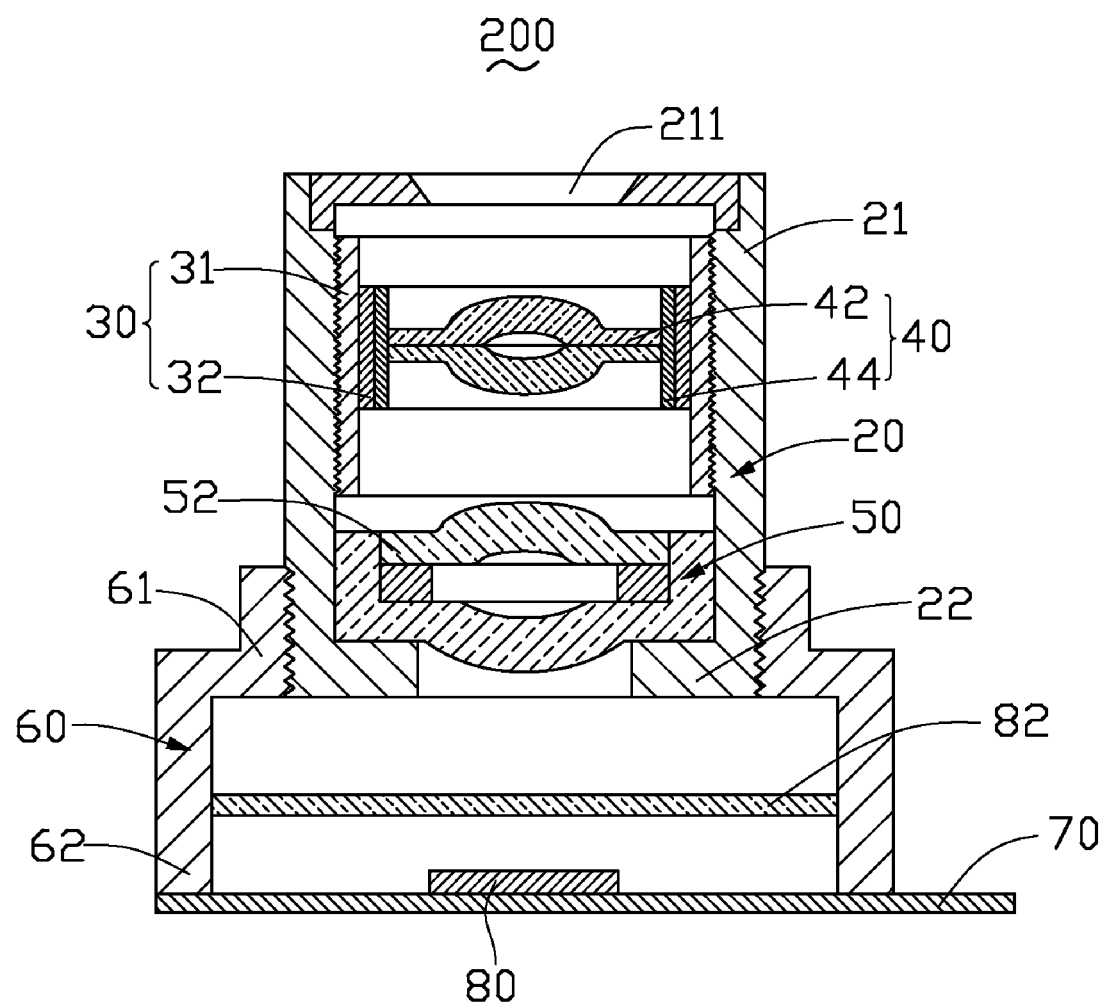
FIG. 4 is a cross section view of a zoom lens module, according to a third present embodiment.

Referring to FIG. 4, another zoom lens module 200 is provided, in accordance with a third preferred present embodiment. Different from the zoom lens module 100 in the first present embodiment, the first lens module 40 of the zoom lens module 200 includes an inner lens barrel 44 and at least a first lens 42 disposed in the inner lens barrel 44. The first lens 42 is fixed in the inner lens barrel 44 using adhesive. The outer diameter of the inner lens barrel 44 is equivalent to the inner diameter of the sliding member 32 such that inner lens barrel 44 is accommodated within the sliding member 32, in close contact therewith. The inner lens barrel 44 can be joined to the sliding member 32 by screw threading or other methods.

The zoom lens modules 100 and 200 each use a piezoelectric ceramic component and a sliding member to form a piezoelectric ceramic motor. The piezoelectric ceramic component drives the sliding member to move along an optical axis of the zoom lens module. Accordingly, a lens module attached to the sliding member is moved relative to another lens module and thus varies the focal length of the zoom lens module. Accordingly, the focusing (e.g., zoom or widening, depending on relative change in focal length) function of the zoom lens modules is achieved. Therefore, the zoom lens module disclosed in the present embodiments achieves the advantages of a simple structure, miniature size, and low production cost.

It will be understood that the above particular embodiments and methods are shown and described by way of illustration only. The principles and features of the present invention may be employed in various and numerous embodiments thereof without departing from the scope of the invention as claimed. The above-described embodiments illustrate the scope of the invention but do not restrict the scope of the invention.

What is claimed is:

1. A zoom lens module comprising:
   a lens barrel;
   a piezoelectric actuator disposed inside the lens barrel, the piezoelectric actuator comprising a piezoelectric ceramic component and a sliding member, the sliding member being in close contact with the piezoelectric ceramic component;
   a first lens module attached to the sliding member of the piezoelectric actuator; and
   a second lens module accommodated in the lens barrel;
   wherein the piezoelectric ceramic component is configured for driving the sliding member and the first lens module attached thereto to move along an optical axis of the zoom lens module relative to the second lens module as a result of a voltage applied to the piezoelectric ceramic component.

2. The zoom lens module as claimed in claim 1, wherein the lens barrel has a first end with an aperture defined therein and an opposite second end.

3. The zoom lens module as claimed in claim 2, wherein the piezoelectric actuator is fixed in the first end, and the second lens module is fixed in the second end.

4. The zoom lens module as claimed in claim 2, wherein the piezoelectric actuator is fixed in the second end, and the second lens module is fixed in the first end.

5. The zoom lens module as claimed in claim 2, wherein the zoom lens module further comprises a third lens module fixed to the first end of the barrel and is located between the aperture and the first lens module.

6. The zoom lens module as claimed in claim 5, wherein the third lens module comprises at least one third lens.

7. The zoom lens module as claimed in claim 5, wherein the third lens module is a compound lens comprising two third lenses.

8. The zoom lens module as claimed in claim 1, wherein the first lens module comprises at least one first lens attached to the sliding member.

9. The zoom lens module as claimed in claim 1, wherein the first lens module is a compound lens comprising two first lenses.

10. The zoom lens module as claimed in claim 1, wherein the second lens module comprises at least one second lens.

11. The zoom lens module as claimed in claim 1, wherein the second lens module is a compound lens comprising two second lenses.

12. The zoom lens module as claimed in claim 1, wherein the first lens module comprises an inner lens barrel and at least one first lens, the first lens being fixed in the inner lens barrel, the inner lens barrel being fixed to the sliding member.

13. The zoom lens module as claimed in claim 12, wherein the inner lens barrel comprises a screw thread on a surface of the inner lens barrel to facilitate a connection thereof with the sliding member.

14. The zoom lens module as claimed in claim 12, wherein the inner lens barrel has an outer diameter and the sliding member has an inner diameter, and the outer diameter of the inner lens barrel is substantially equivalent to the inner diameter of the sliding member.

15. The zoom lens module as claimed in claim 1, wherein the first lens module comprises at least one first lens, at least one first lens being coated with an anti-reflection coating.

16. The zoom lens module as claimed in claim 1, wherein the piezoelectric ceramic component has a cylindrical shape with an inner diameter equivalent to an outer diameter of the sliding member.

17. The zoom lens module as claimed in claim 16, wherein the piezoelectric ceramic component is joined to the lens barrel by a screw thread.

18. The zoom lens module as claimed in claim 1, wherein the piezoelectric ceramic component further comprises a holder having a first end and a second end, the lens barrel being joined to the holder in the first end.

19. The zoom lens module as claimed in claim 1, wherein the piezoelectric ceramic component is configured for operating by having a high frequency voltage applied thereto.

* * * * *